(12) United States Patent
Gibson et al.

(10) Patent No.: US 7,574,290 B2
(45) Date of Patent: Aug. 11, 2009

(54) METHOD AND SYSTEM FOR IMPLEMENTING AUTOMATIC VEHICLE CONTROL WITH PARAMETER-DRIVEN DISENGAGEMENT

(75) Inventors: Mark Gibson, Portland, OR (US);
Charles Manning, Whitecliffs (NZ);
Arthur F. Lange, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 614 days.

(21) Appl. No.: 11/000,738

(22) Filed: Nov. 30, 2004

(65) Prior Publication Data

US 2006/0116798 A1    Jun. 1, 2006

(51) Int. Cl.
*G01C 22/00* (2006.01)
(52) U.S. Cl. ............... 701/26; 701/50; 701/213; 180/401; 180/403; 177/2
(58) Field of Classification Search .......... 701/26, 701/207, 23, 41, 50–51, 200, 210, 213; 180/400–401, 180/403; 172/132; 73/1.79; 77/2
See application file for complete search history.

(56) References Cited

U.S. PATENT DOCUMENTS

| | | | |
|---|---|---|---|
| 2,805,585 A | 9/1957 | Besserman | |
| 3,648,539 A * | 3/1972 | Rouis | 74/494 |
| 3,895,545 A | 7/1975 | Hunter | |
| 4,301,739 A | 11/1981 | Mehren et al. | |
| 4,453,485 A * | 6/1984 | Houghton-Brown et al. | 114/144 A |
| 4,515,221 A * | 5/1985 | van der Lely | 172/3 |
| 4,607,716 A | 8/1986 | Beck | |
| 4,922,427 A | 5/1990 | Yokoe et al. | |
| 5,121,799 A * | 6/1992 | Barnes et al. | 172/6 |
| 5,235,927 A | 8/1993 | Singh et al. | |
| 5,313,769 A | 5/1994 | Barnes et al. | |
| 5,489,005 A | 2/1996 | Marcott et al. | |
| 5,513,107 A | 4/1996 | Gormley | |
| 5,563,786 A * | 10/1996 | Torii | 701/23 |
| 5,928,309 A | 7/1999 | Korver et al. | |
| 5,935,191 A | 8/1999 | Sakanashi et al. | |
| 5,941,917 A * | 8/1999 | Barnes et al. | 701/23 |
| 5,956,250 A | 9/1999 | Gudat et al. | |
| 5,978,731 A | 11/1999 | Matsuda | |

(Continued)

FOREIGN PATENT DOCUMENTS

CN    101109958 A  *  1/2008

(Continued)

OTHER PUBLICATIONS

Video-based lane estimation and tracking for driver assistance: survey, system, and evaluation; McCall, J.C.; Trivedi, M.M.; Intelligent Transportation Systems, IEEE Transactions on; vol. 7, Issue 1, Mar. 2006 pp. 20-37; Digital Object Identifier 10.1109/TITS.2006. 869595.*

(Continued)

*Primary Examiner*—Cuong H Nguyen

(57) ABSTRACT

Embodiments of the present invention recite a method and system for implementing automatic vehicle control with parameter-driven disengagement. In one embodiment, a course for a vehicle is determined along which the vehicle is to be automatically guided. An indication is received that a pre-defined parameter has been exceeded In response to receiving the indication, the generation of vehicle control commands is then suspended.

17 Claims, 11 Drawing Sheets

U.S. PATENT DOCUMENTS

| | | | |
|---|---|---|---|
| 6,052,647 A * | 4/2000 | Parkinson et al. | 701/215 |
| 6,067,782 A | 5/2000 | Diekhans | |
| 6,070,539 A | 6/2000 | Flamme et al. | |
| 6,101,795 A | 8/2000 | Diekhans | |
| 6,198,992 B1 | 3/2001 | Winslow | |
| 6,212,452 B1 | 4/2001 | Shimizu et al. | |
| 6,236,924 B1 * | 5/2001 | Motz et al. | 701/50 |
| 6,314,348 B1 | 11/2001 | Winslow | |
| 6,356,819 B1 | 3/2002 | Winslow | |
| 6,434,462 B1 | 8/2002 | Bevly et al. | |
| 6,445,989 B2 | 9/2002 | Nishimura et al. | |
| 6,539,303 B2 * | 3/2003 | McClure et al. | 701/213 |
| 6,553,299 B1 | 4/2003 | Keller et al. | |
| 6,665,598 B2 | 12/2003 | Nakano et al. | |
| 6,876,920 B1 | 4/2005 | Mailer | |
| 6,980,895 B2 | 12/2005 | Paice et al. | |
| 7,142,956 B2 * | 11/2006 | Heiniger et al. | 701/23 |
| 7,188,015 B2 * | 3/2007 | Lange et al. | 701/50 |
| 7,228,214 B2 | 6/2007 | Flann et al. | |
| 2001/0025216 A1 | 9/2001 | Nishimura et al. | |
| 2002/0165654 A1 | 11/2002 | Weaver et al. | |
| 2003/0089535 A1 | 5/2003 | Kanzler et al. | |
| 2004/0181322 A1 * | 9/2004 | Okuyama | 701/21 |
| 2004/0186644 A1 | 9/2004 | McClure et al. | |
| 2004/0210357 A1 | 10/2004 | McKay et al. | |
| 2004/0254690 A1 | 12/2004 | Hasegawa et al. | |
| 2005/0004732 A1 | 1/2005 | Berry et al. | |
| 2005/0165546 A1 | 7/2005 | Aral | |
| 2005/0288834 A1 * | 12/2005 | Heiniger et al. | 701/23 |
| 2006/0015228 A1 * | 1/2006 | Lange | 701/41 |
| 2006/0064222 A1 * | 3/2006 | Palmer | 701/50 |
| 2006/0116798 A1 * | 6/2006 | Gibson et al. | 701/26 |
| 2006/0142936 A1 | 6/2006 | Dix | |
| 2006/0190152 A1 | 8/2006 | Schick et al. | |

FOREIGN PATENT DOCUMENTS

| | | | |
|---|---|---|---|
| DE | 4210001 A1 * | 9/1993 | |
| EP | 137435 A2 * | 4/1985 | |
| FR | 2686432 | 7/1997 | |
| JP | 03148384 A * | 6/1991 | |
| JP | 2001191936 A * | 7/2001 | |
| JP | 2007167035 A * | 7/2007 | |
| JP | 2007185984 A * | 7/2007 | |
| JP | 2008193932 A * | 8/2008 | |

OTHER PUBLICATIONS

Power-steering control architecture for automatic driving; Naranjo, J.E.; Gonzalez, C.; Garcia, R.; de Pedro, T.; Haber, R.E.; Intelligent Transportation Systems, IEEE Transactions on; vol. 6, Issue 4, Dec. 2005 pp. 406-415; Digital Object Identifier 10.1109/TITS.2005.858622.*

Cascaded Kalman Filters for Accurate Estimation of Multiple Biases, Dead-Reckoning Navigation, and Full State Feedback Control of Ground Vehicles; Bevly, D.M.; Parkinson, B.; Control Systems Technology, IEEE Transactions on; vol. 15, Issue 2, Mar. 2007 pp. 199-208; Digital Object Identifier 10.1109/TCST.2006.883311.*

Control System for Tractor-Platooning; Zhongxiang Zhu; Takeda, J.-i.; Torisu, R.; Jun Chen; Zhenghe Song; Enrong Mao; Mechatronics and Automation, 2007. ICMA 2007. International Conference on; Aug. 5-8, 2007 pp. 3173-3178; Digital Object Identifier 10.1109/ICMA.2007.4304069.*

Experimental validation of a MATLAB based control architecture for multiple robot outdoor navigation; Doitsidis, L.; Nelson, A.L.; Valavanis, K.P.; Long, M.T.; Murphy, R.R.; Intelligent Control, 2005. Proceedings of the 2005 IEEE International Symposium on, Mediterrean Conference on Control and Automation 2005 pp. 1499-1505.*

Manoeuvrable Gantry Tractor Comprising a "Chorus Line" of Synchronised Modules; Spark, I. J.; Ibrahim, M. Yousef; Industrial Electronics, 2007. ISIE 2007. IEEE International Symposium on; Jun. 4-7, 2007 pp. 2208-2213; Digital Object Identifier 10.1109/ISIE.2007.4374951.*

An autonomous excavator with vision-based track-slippage control; Saeedi, P.; Lawrence, P.D.; Lowe, D.G.; Jacobsen, P.; Kusalovic, D.; Ardron, K.; Sorensen, P.H.; Control Systems Technology, IEEE Transactions on; vol. 13, Issue 1, Jan. 2005 pp.: 67-84; Digital Object Identifier 10.1109/TCST.2004.838551.*

A. Hemami and M. Mehrabi, "On the steering control of automated vehicles," in Proc. IEEE Conf. Intelligent Transportation System, 1997, pp. 266-271.*

S. Singh, "State of the art in automation of earthmoving," ASCE J. Aerosp. Eng., vol. 10, No. 4, pp. 179-188, 1997.*

M. Mehrabi, A. Hemami, and R. Cheng, "Analysis of steering control in vehicles with two independent left and right traction wheels," in Proc. 5th Int. Conf. Advanced Robotics, Pisa, Italy, 1991, pp. 1634-1637.*

The effects of drive configuration on undesirable behaviors of articulated steer vehicles; Azad, N.L.; Khajepour, A.; McPhee, J.; Vehicle Power and Propulsion, 2005 IEEE Conference; Sep. 7-9, 2005 pp. :450 - 454. Digital Object Identifier 10.1109A/VPPC.2005.1554558.*

Automation of an Agricultural Tractor for Fruit Picking; Katupitiya, J.; Eaton, R.; Cole, A.; Meyer, C.; Rodnay, G.; Robotics and Automation, 2005. ICRA 2005. Proceedings of the 2005 IEEE International Conference on; Apr. 18-22, 2005 pp. :3201 - 3206.*

Model-reference adaptive steering control of a farm tractor with varying hitch forces; Derrick, J.B.; Bevly, D.M.; Rekow, A.K.; American Control Conference, 2008; Jun. 11-13, 2008 pp. :3677-3682; Digital Object Identifier 10.1109/ACC.2008.4587065.*

Patent Abstracts of Japan vol. 015, No. 235 (M-1125), Jun. 17, 1991 & JP 03 074256 A (Fuji Heavy Ind Ltd), Mar. 28, 1991 abstract.

* cited by examiner

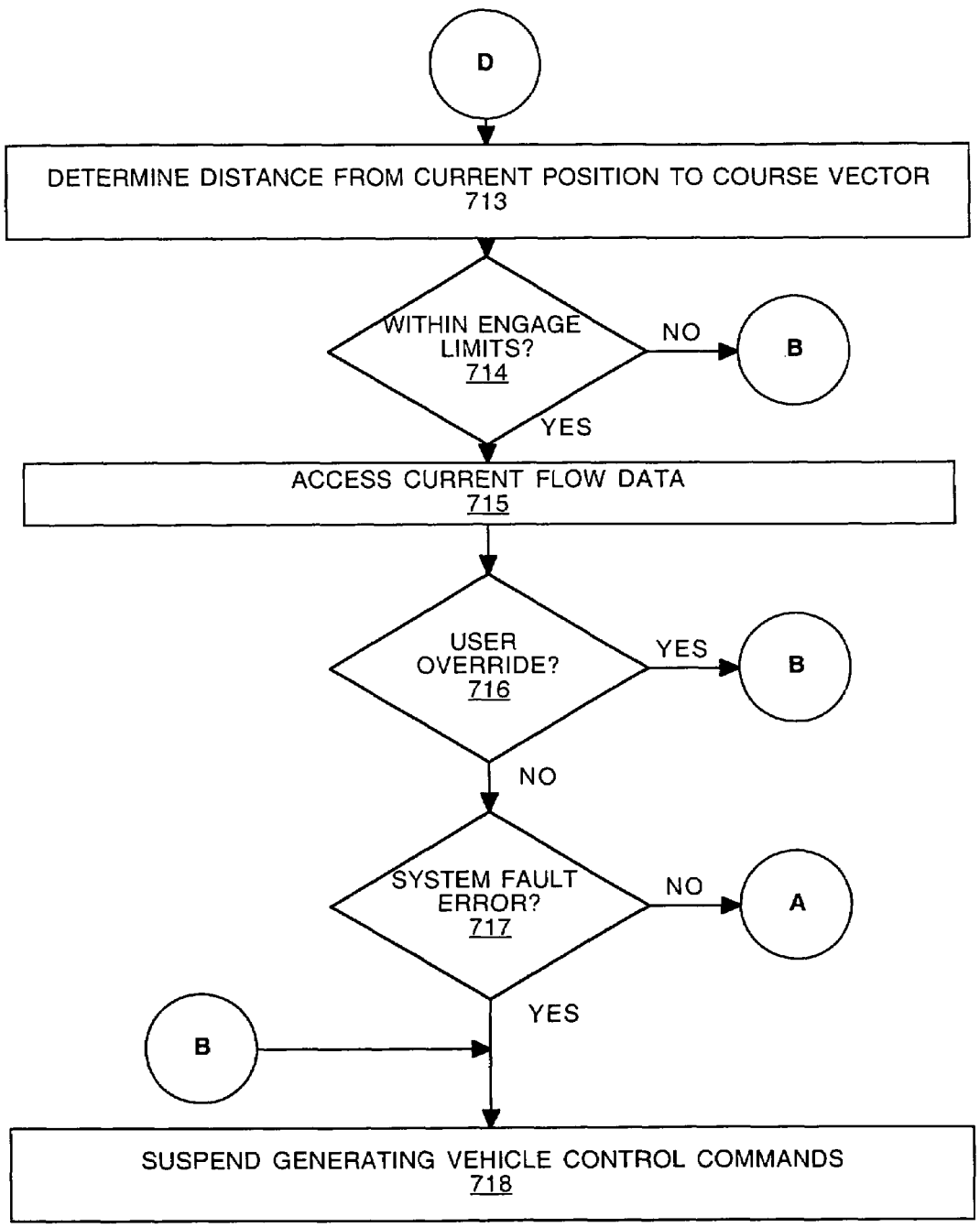

METHOD AND SYSTEM FOR IMPLEMENTING AUTOMATIC VEHICLE CONTROL WITH PARAMETER-DRIVEN DISENGAGEMENT

FIELD OF THE INVENTION

Embodiments of the present invention are directed to controlling a mobile machine. More specifically, embodiments of the present invention relate to a method and system for parameter-driven disengagement of an automatic vehicle control system.

BACKGROUND OF THE INVENTION

Operating agricultural vehicles such as tractors and harvesters often requires highly repetitive operations. For example, when plowing or planting a field, an operator must make repeated passes across a field. Due to the repetitive nature of the work and irregularities in the terrain, gaps and overlaps in the rows of crops can occur. This can result in damaged crops, overplanting, or reduced yield per acre. As the size of agricultural vehicles and farming implements continues to increase, precisely controlling their motion becomes more important.

Guidance systems are increasingly used for controlling agricultural and environmental management equipment and operations such as road side spraying, road salting, and snow plowing where following a previously defined route is desirable. This allows more precise control of the vehicles than is typically realized than if the vehicle is steered by a human. Many agricultural vehicles rely upon furrow followers which mechanically detect whether the vehicle is moving parallel to a previously plowed plant furrow. However, these guidance systems are most effective in flat terrain and when detecting furrows plowed in a straight line. Additionally, many of these systems require factory installation and are too expensive or inconvenient to facilitate after market installation.

A component for controlling the steering mechanism of the vehicle is used to control the movement of the vehicle in a desired direction. Thus, the guidance system generates a steering command which is implemented by the component which controls the steering mechanism. Often, the controlling component is directly coupled with and manipulates hydraulic pumps which comprise the power steering system of the vehicle. Other controlling components manipulate the steering wheel of the vehicle.

Prior art guidance systems are problematic in that there typically is no provision made for logically disengaging the guidance system. Thus, if a vehicle operator attempts to manually steer the vehicle (e.g., to pass to the side of a rock) the guidance system will continue trying to steer the vehicle in the original direction. This can be unsafe for the operator and may result in damage to the vehicle, or injury to the operator. Because there is no logical disengagement for the guidance system, the user has to manually operate motor mount 500 to disengage it from the steering wheel.

SUMMARY OF THE INVENTION

Accordingly, a need exists for a method and system for implementing automatic vehicle control which facilitates logically disengaging the guidance system from a steering control apparatus without requiring that the steering control apparatus be physically disengaged from the steering mechanism of the vehicle.

Embodiments of the present invention recite a method and system for implementing automatic vehicle control with parameter-driven disengagement. In one embodiment, a course for a vehicle is determined along which the vehicle is to be automatically guided. An indication is received that a pre-defined parameter has been exceeded. In response to receiving the indication, the generation of vehicle control commands is then suspended.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIGS. 7A, 7B, and 7C are a flowchart of a method for implementing automatic vehicle control with parameter-driven disengagement in accordance with embodiments of the present invention.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "receiving," "suspending," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
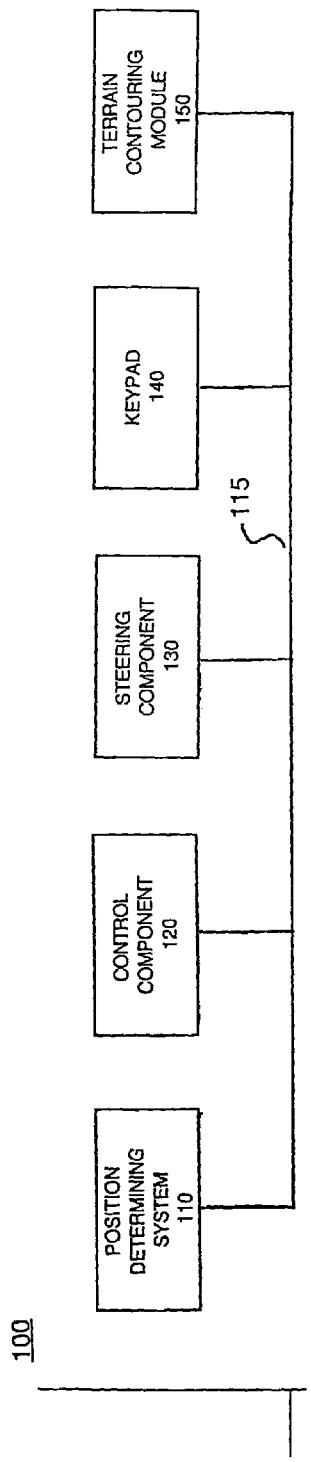
FIGS. 1A and 1B show an exemplary system for controlling a mobile machine with parameter-driven disengagement in accordance with embodiments of the present invention.

FIG. 1A is a block diagram of an exemplary system 100 for controlling a mobile machine 105 in accordance with embodiments of the present invention. In embodiments of the present invention, system 100 is a vehicle guidance system used to generate and implement vehicle control commands to facilitate controlling a vehicle automatically. In FIG. 1A, a position determining system 110 is coupled with a control component 120 and a steering component 130 via a communication network or coupling 115. Additionally, system 100 may comprise an optional keypad 140 and/or a terrain compensation module (TCM) component (e.g., TCM 150) which are also coupled with coupling 115.

In embodiments of the present invention, coupling 115 is a serial communications bus. In one embodiment, coupling 115 is compliant with, but not limited to, the controller area network (CAN) protocol. CAN is a serial bus system which was developed for automotive use in the early 1980s. The Society of Automotive Engineers (SAE) has developed a standard CAN protocol, SAE J1939, based upon CAN specification 2.0. The SAE J1939 specification provides plug-and-play capabilities and allows components from various suppliers to be easily integrated in an open architecture. However, embodiments of the present invention may be communicatively coupled using other communication systems such as a wireless network.

Figure 1B:
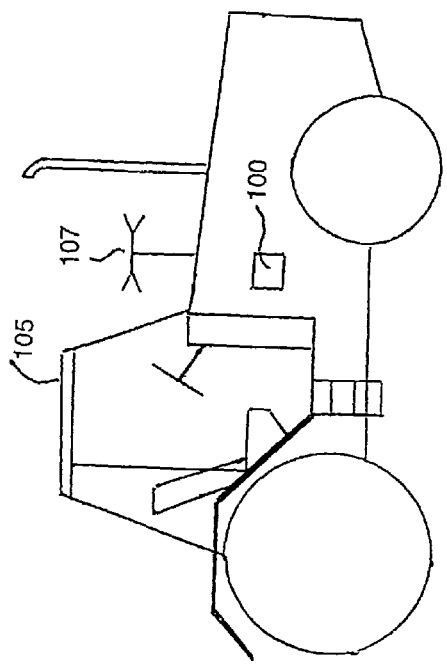

Position determining system 110 determines the geographic position of mobile machine 105. For the purposes of the present invention, the term "geographic position" means the determining in at least two dimensions (e.g., latitude and longitude), the location of mobile machine 105. In one embodiment of the present invention, position determining system 110 is a satellite based position determining system and receives navigation data from satellites via antenna 107 of FIG. 1B. Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present invention are well suited for using other position determining systems as well such as ground-based position determining systems, or other satellite-based position determining systems such as the GLONASS system, or the Galileo system currently under development.

In embodiments of the present invention, control component 120 receives position data from position determining system 110 and generates commands for controlling mobile machine 105. In embodiments of the present invention, mobile machine 105 is an agricultural vehicle such as a tractor, a harvester, etc. However, embodiments of the present invention are well suited for controlling other vehicles such as snow plows, construction equipment, road salting, or roadside spraying equipment as well. In one embodiment, in response to position data received from position determining system 110, control component 120 generates a message (e.g., a steering command) to steering component 130 which then controls the steering mechanism of mobile machine 105. In embodiments of the present invention, control component 120 is operable for generating steering commands to an electrical steering component and a hydraulic steering component depending upon the configuration of system 100.

In embodiments of the present invention, keypad 140 provides additional input/output capabilities to system 100. In embodiments of the present invention, keypad 140 may also comprise a device drive which allows reading a media storage device such as a compact disk (CD), a digital versatile disk (DVD), a memory stick, or the like. This allows, for example, integrating data from various software applications such as mapping software in order to facilitate controlling the movement of mobile machine 105. For example, field boundaries can be easily input into system 100 to facilitate controlling the movement of mobile machine 105.

TCM 150 provides the ability to compensate for terrain variations which can reduce the precision of position determining system 110 in determining the geographic position of mobile machine 105. For example, when traversing a hillside, the antenna 107 of the position determining system 110 can be displaced to one side or the other with respect to the center line of mobile machine 105, thus causing errors in determining the geographic position of mobile machine 105. As a result, gaps or overlaps can occur when plowing across contoured terrain is being performed. TCM 150 can detect the magnitude of displacement of antenna 107 with respect to the center line of mobile machine 105 (e.g., due to roll, pitch, and yaw) and send signals which allow control component 120 to generate steering commands which compensate for the errors in determining the geographic position of mobile machine 105. It is appreciated that the components described with reference to FIG. 1 may be implemented as separate components. However, in embodiments of the present invention, these components may be integrated as various combinations of discreet components, or as a single device.

Figure 2:
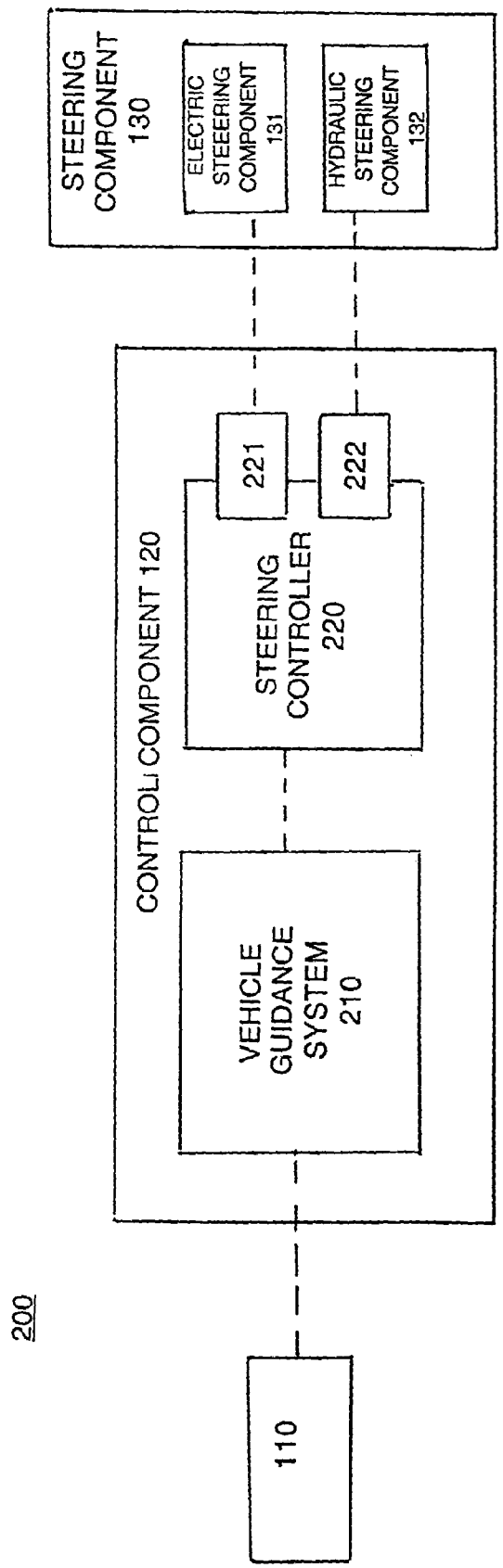
FIG. 2 shows an exemplary system architecture in accordance with embodiments of the present invention.

FIG. 2 shows an exemplary system architecture 200 in accordance with embodiments of the present invention. In the embodiment of FIG. 2, control component 120 comprises a vehicle guidance system 210 which is coupled with a steering controller 220. It is appreciated that in embodiments of the present invention, vehicle guidance system 210 and steering controller 220 may be implemented as a single unit, or separately. Implementing steering controller 220 separately is advantageous in that it facilitates implementing the present invention as an after market kit which can be easily added to an existing vehicle navigation system. As a result, the costs for components and for installation of the control system of the present invention are reduced. However, embodiments of the present invention are well suited to be factory installed as original equipment for mobile machine 105 as well.

In embodiments of the present invention, vehicle guidance system 210 uses position data from position determining system 110, user input such as a desired pattern or direction, as well as vector data such as desired direction and distance to determine course corrections which are used for guiding mobile machine 105. Roll, pitch, and yaw data from TCM 150 may also be used to determine course corrections for mobile machine 105. For purposes of the present invention, the term "course" means a direction between at least two geographic positions. For purposes of the present invention, the term "course correction" means a change in the direction traveled by mobile machine 105 such that mobile machine 105 is guided from a current direction of travel to a desired direction of travel and/or a current geographic position to a desired geographic position. In embodiments of the present invention, vehicle guidance system 210 is a commercially available guidance system such as the AgGPS® guidance system manufactured by Trimble Navigation Ltd. of Sunnyvale Calif.

Additional data used to determine course corrections may also comprise swath calculation which takes into account the width of various implements which may be coupled with mobile machine 105. For example, if a harvester can clear a swath of 15 feet in each pass, vehicle guidance system 210 may generate steering commands which cause mobile machine 105 to move 15 feet to one side in the next pass. Vehicle guidance system 210 may also be programmed to follow straight or curved paths which is useful when operating in irregularly shaped or contoured fields or in fields disposed around a center pivot. This is also useful in situations in which the path being followed by mobile machine 105 is obscured. For example, an operator of a snowplow may not be able to see the road being cleared due to the accumulation of snow on the road. Additionally, visibility may be obscured by snow, rain, or fog. Thus, it would be advantageous to utilize embodiments of the present invention to guide mobile machine 105 in these conditions. In embodiments of the present invention, position determining component 110 may be integrated into vehicle guidance system 210 or may be a separate unit. Additionally, as stated above with reference to FIG. 1, position determining component 110, control component 120 and steering component 130 may be integrated into a single unit in embodiments of the present invention.

In embodiments of the present invention, the course correction calculated by vehicle guidance system 210 is sent from vehicle guidance system 210 to steering controller 220.

Steering controller 220 translates the course correction generated by guidance system 210 into a steering command for manipulating the steering mechanism of mobile machine 105. Steering controller 220 generates a message conveying the steering command to steering component 130. In embodiments of the present invention, the communicative coupling between vehicle guidance system 210, steering controller 220 and steering component 130 is accomplished using coupling 115 (e.g., a serial bus, or CAN bus).

In embodiments of the present invention, steering component 130 may comprise an electric steering component 131, or a hydraulic steering component 132. Thus, as shown in FIG. 2, steering controller 220 comprises a first output 221 for coupling steering controller 220 with electric steering component 131, and a second output 222 for coupling steering controller 220 with hydraulic steering component 132. Because coupling 115 may be compliant with the CAN protocol, plug and play functionality is facilitated in system 200. Therefore, in embodiments of the present invention, steering controller can determine which steering component it is coupled with depending upon which output of steering controller 220 is used.

Steering controller 220 then generates a message, based upon the steering component with which it is coupled, which causes the steering component to actuate the steering mechanism of mobile machine 105. For example, if steering controller 220 determines that output 221 is being used, it generates a steering command which is formatted for controlling electric steering component 131. If steering controller 220 determines that output 222 is being used, it generates a steering command which is formatted for controlling hydraulic steering component 132. In embodiments of the present invention, the message sent by steering controller 220 may comprise a control voltage, control current, or a data message.

Figure 3B:
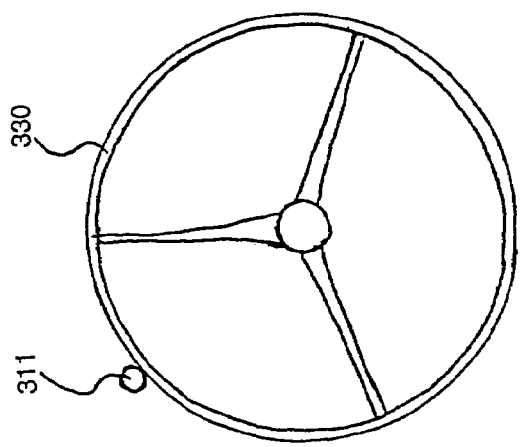
FIGS. 3A and 3B show side and top views respectively of a system for controlling a mobile machine with parameter-driven disengagement in accordance with embodiments of the present invention.
Figure 3A:
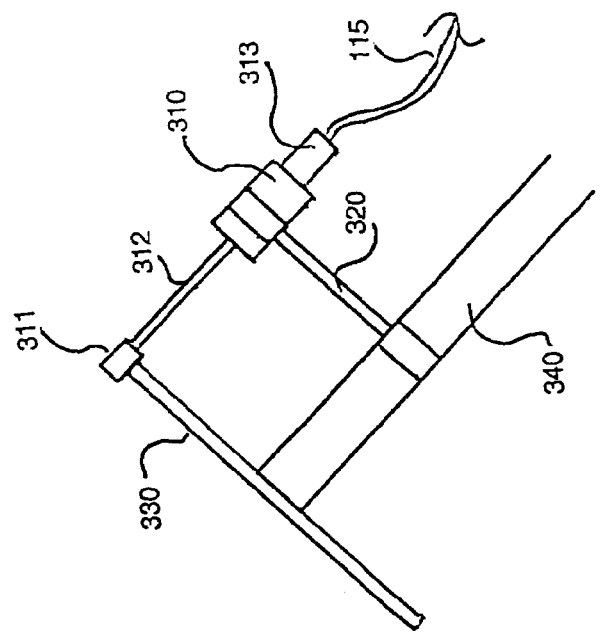

FIGS. 3A and 3B show side and top views respectively of a system 300 for controlling a mobile machine in accordance with embodiments of the present invention. In the embodiment of FIG. 3A, a steering component (e.g., electric steering component 131 of FIG. 2) comprises an electric motor 310 which is coupled with an actuator device via a shaft 312. In the embodiment of FIG. 3A, actuator device comprises a drive wheel 311 which is in contact with steering wheel 330 of mobile machine 105. In embodiments of the present invention, electric motor 310 may be directly coupled with drive wheel 311, or may be coupled via a low ratio gear (not shown). Using these methods to couple electric motor 313 and drive wheel 311 are advantageous in that a smaller electric motor can be used while still generating sufficient torque to control steering wheel 330. Thus, if a user wants to manually steer mobile machine 105, the user will encounter less resistance from electric motor 310 when the motor is disengaged.

In embodiments of the present invention, the electric motor coupled with drive wheel 311 is a non-geared motor and the performance parameters of the electric motor coupled are selected so that, for example, electric motor 310 may be installed in a variety of vehicle types and/or manufacturers. For example, a certain amount of torque is desired in order to be able to turn steering wheel 330. It is also important to determine a desired ratio between the torque generated by the motor and the electrical current driving the motor. Because there is a power loss across the transistors comprising control component 120 that are proportional to the square ($X^2$) of the current passing through the circuit, it is desirable to utilize a lower amount of current. However, if too little current is used, the motor turns too slowly to provide a desired level of responsiveness to steering commands. Additionally, if the torque constant (e.g., ounce/inches per amp) is too high, excessive "back-EMF," which is an electro-magnetic field, is generated by the motor and interferes with the current flowing into the motor. While a higher voltage can overcome the back-EMF issue, most vehicles utilize 12 volt batteries, thus indicating that a higher amount of current is desired. In embodiments of the present invention, a non-geared electric motor which generates approximately nineteen ounce/inches of torque per amp of current is utilized. In other embodiments of the present invention, the performance parameters of the electric motor are selected to more specifically match the motor with a particular vehicle type, model, or manufacturer.

Electric steering component 131 further comprises a motor control unit 313 is coupled with electric motor 310 and with a control component 120 of FIG. 2 via coupling 115. In FIG.

3A, electric motor 310 is coupled with the steering column 340 via a bracket 320. It is appreciated that in embodiments of the present invention, electric motor 310 may be coupled with steering column 340 using another apparatus than bracket 320. For example, in one embodiment, electric motor 310 may be coupled with a bracket which is attached via suction cups with the windshield or dashboard of mobile machine 105. In another embodiment, electric motor 310 may be coupled with a pole which is extended between the floor and roof of mobile machine 105. Furthermore, while the present embodiment shows motor control unit 313 directly coupled with electric motor 310, embodiments of the present invention are well suited to utilize other configurations. For example, in one embodiment motor control unit 313 may be implemented as a sub-component of control unit 120 and may only send a control voltage to electric motor 310 via an electrical coupling (not shown). In another embodiment, motor control unit 313 may be implemented as a separate unit which is communicatively coupled with control unit 120 via coupling 115 and with electric motor 310 via an electrical coupling (not shown).

In embodiments of the present invention, drive wheel 311 is coupled with steering wheel 330 with sufficient friction such that rotation of drive 311 causes rotation of steering wheel 330. In embodiments of the present invention, a spring (not shown) maintains sufficient pressure for coupling drive wheel 311 with steering wheel 330. However, the spring does not maintain sufficient pressure between drive wheel 311 and steering wheel 330 to pinch a user's fingers if, for example, the user is manually steering mobile machine 105 and the user's fingers pass between drive wheel 311 and steering wheel 330. While the embodiment of FIGS. 3A and 3B show drive wheel 311 contacting the outside portion of steering wheel 330, in other embodiments of the present invention, drive wheel 311 contact the inside portion of steering wheel 330.

In embodiments of the present invention, electric motor 310 is reversable, thus, depending upon the steering command sent from control component 120, motor control unit 313 controls the current to electric motor 310 such that it rotates in a clockwise of counter-clockwise direction. As a result, steering wheel 330 is turned in a clockwise or counter-clockwise direction as well. Typically, the current running through electric motor 310 is calibrated so that drive wheel 311 is turning steering wheel 330 without generating excessive torque. This facilitates allowing a user to override electric steering component 131. In embodiments of the present invention, electric motor 310 may be a permanent magnet brush direct current (DC) motor, a brushless DC motor, a stepper motor, or an alternating current (AC) motor.

In embodiments of the present invention, motor control unit 313 can detect when a user is turning steering wheel 330 in a direction counter to the direction electric steering component 131 is turning. For example, a shaft encoder (not shown) may be used to determine which direction shaft 312 is turning. Thus, when a user turns steering wheel 330 in a direction which counters the direction electric motor 310 is turning, the shaft encoder detects that the user is turning steering wheel 330 and generates a signal to motor control unit 313. In response to determining that a user is turning steering wheel 330, motor control unit 313 can disengage the power supplied to electric motor 310. As a result, electric motor 310 is now freewheeling and can be more easily operated by the user. In another embodiment, motor control unit 313 when steering wheel 330 is turned counter to the direction electric motor is turning, a circuit in motor control unit 313 detects that electric motor 310 is stalling and disengages the power supplied to electric motor 310. In another embodiment, a switch detects the rotation of steering wheel 330 and sends a signal to motor control unit 313. Motor control unit 313 can then determine that the user is manually steering mobile machine 105 and disengage electric motor 310. As a result, when a user turns steering wheel 330, their fingers will not be pinched if they pass between drive wheel 311 and steering wheel 330 because electric motor 310 is freewheeling when the power is disengaged.

Embodiments of the present invention are advantageous over conventional vehicle control systems in that it can be easily and quickly installed as an after market kit. For example, conventional control systems typically control a vehicle using solenoids and hydraulic flow valves which are coupled with the power steering mechanism of the vehicle. These systems are more difficult to install and more expensive than the above described system due to the higher cost of the solenoids and hydraulic flow valves as well as the additional labor involved in installing the system. The embodiment of FIG. 3 can be easily bolted onto steering column 340 and coupled with steering controller 220. Additionally, electric motor 310 can be fitted to a variety of vehicles by simply exchanging bracket 320 for one configured for a particular vehicle model. Furthermore, embodiments of the present invention do not rely upon furrow feelers which typically must be raised from and lowered into a furrow when the end of the furrow is reached. As a result, less time is lost in raising or lowering the furrow feeler.

Figure 4B:
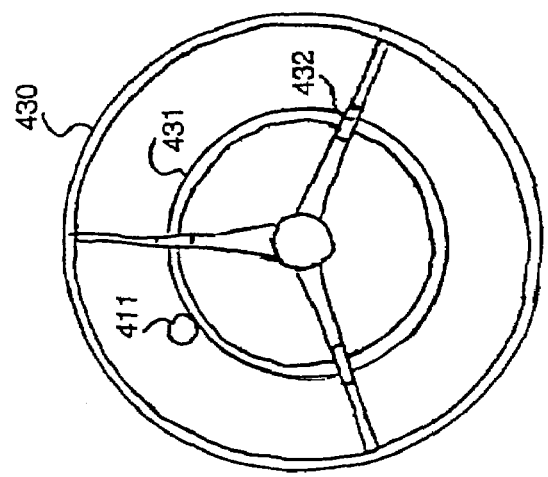
FIGS. 4A and 4B show side and top views respectively of a system for controlling a mobile machine with parameter-driven disengagement in accordance with embodiments of the present invention.
Figure 4A:
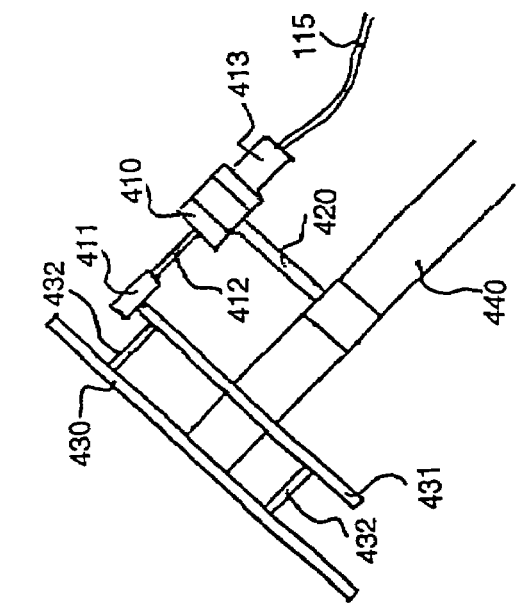

FIGS. 4A and 4B show side and top views respectively of a system 400 for controlling a mobile machine in accordance with embodiments of the present invention. In FIG. 4A, the steering component (e.g., electric steering component 131 of FIG. 2) comprises an electric motor 410 which is coupled with drive wheel 411 via shaft 412 and a motor control unit 413. Motor control unit 413 couples electric motor 410 with steering controller 220 of FIG. 2. In FIG. 4A, electric motor 410 is connected with steering column 440 via bracket 420. In the embodiment of FIGS. 4A and 4B, drive wheel 411 is coupled with a sub wheel 431 which is coupled with steering wheel 330 via brackets 432.

In the embodiment of FIGS. 4A and 4B, electric motor 410 turns in a clockwise or counter-clockwise direction depending upon the steering command received by motor control unit 413. As a result, drive wheel 411 causes sub wheel 431 to turn in clockwise or counter clockwise direction as well. Utilizing sub wheel 431 prevents a user's fingers from being pinched between steering wheel 430 and drive wheel 411 if the user chooses to manually steer the vehicle. In embodiments of the present invention, sub wheel 431 can be easily and quickly coupled with steering wheel 430 by, for example, attaching brackets 432 to the spokes of steering wheel 430.

Figure 5B:
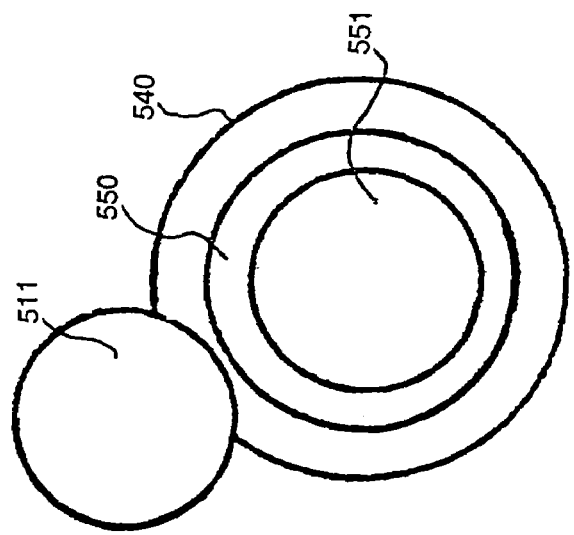
FIGS. 5A and 5B show side and top views respectively of a system for controlling a mobile machine with parameter-driven disengagement in accordance with embodiments of the present invention.
Figure 5A:
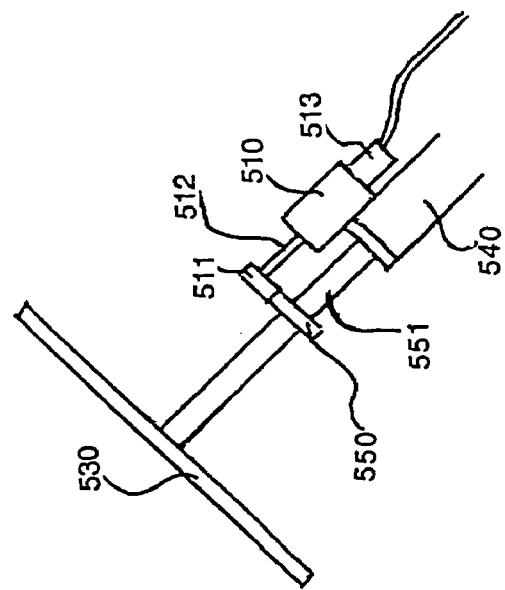

FIGS. 5A and 5B are side and sectional views respectively of a system 500 for controlling a mobile machine in accordance with embodiments of the present invention. In FIG. 5A, the steering component (e.g., electric steering component 131 of FIG. 2) comprises an electric motor 510 which is coupled with gear 511 via shaft 512 and with a motor control unit 513. Motor control unit 413 couples electric motor 510 with steering controller 220 of FIG. 2. In FIG. 5A, electric motor 510 is coupled with steering column 540.

FIG. 5B is a section view of system 500 and shows steering shaft 550 disposed within steering column 540. A gear 551 couples steering shaft 550 with gear 511 of electric steering component 131. In the present embodiment, electric motor 510 turns in a clockwise or counter clockwise direction depending upon the steering command received by motor control unit 513. As a result, gear 511 also turns in a clockwise or counter clockwise direction, thus causing steering shaft 550 to turn due to the force conveyed by gear 551. While the present embodiment recites coupling electric steering component 131 with steering shaft 550 using gears, embodiments of the present invention are well suited for using other mechanical couplings such as a gear and chain, a belt and pulleys, etc.

Figure 6:
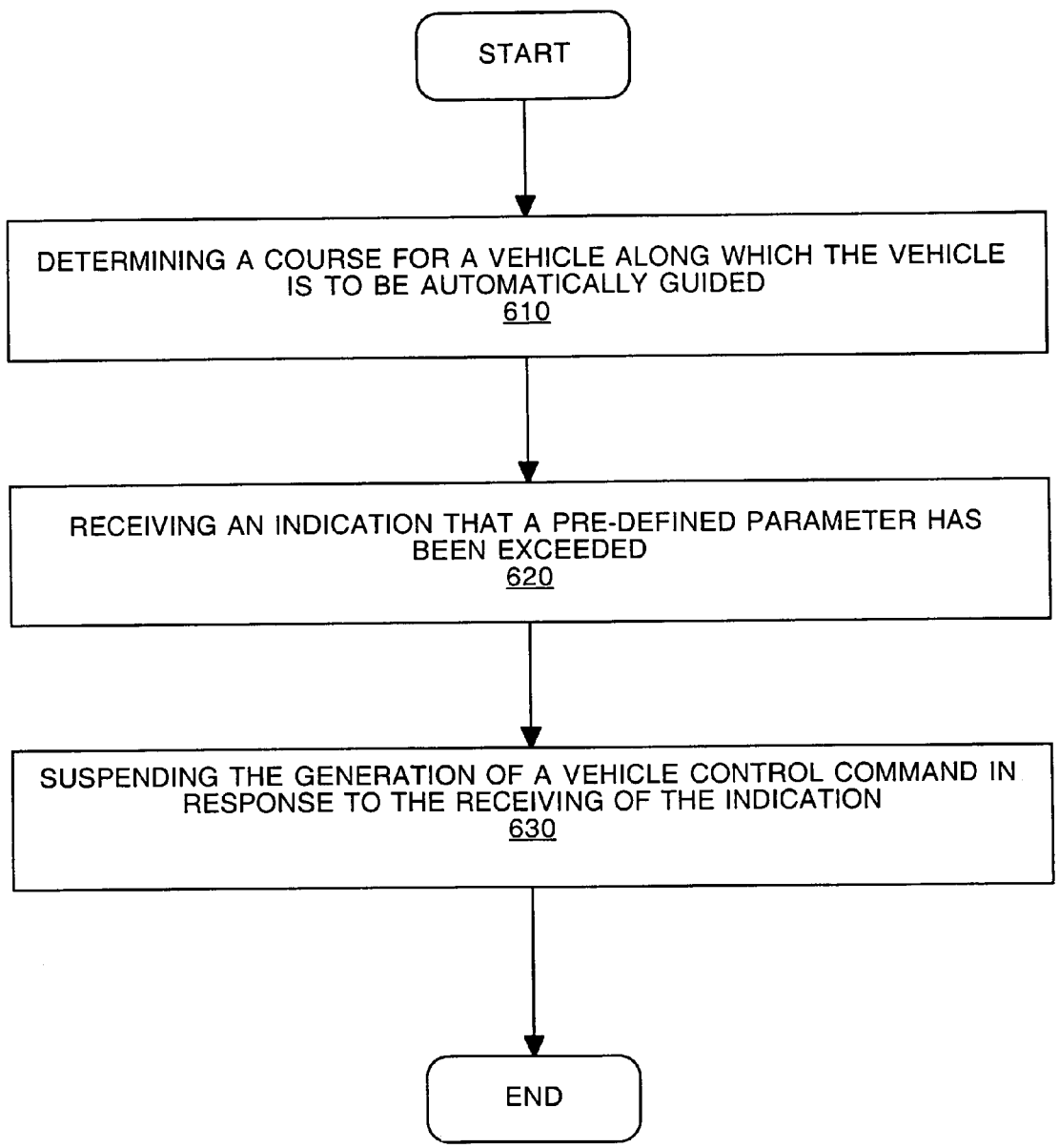
FIG. 6 is a flowchart of a method for implementing automatic vehicle control with parameter-driven disengagement in accordance with embodiments of the present invention.

FIG. 6 is a flowchart of a method 600 for implementing automatic vehicle control with parameter-driven disengagement in accordance with embodiments of the present invention. In embodiments of the present invention, method 600 is implemented to facilitate implementing automatic vehicle control in a safe manner. In embodiments of the present invention, method 600 is implemented by, for example, control component 120 of system 100. It is noted that while the following discussions will cite using method 600 in conjunction with agricultural vehicles, embodiments of the present invention may be used in other applications such as construction equipment and/or road servicing equipment such as snowplows or salt spreading trucks.

In step 610 of FIG. 6, a course is determined for a vehicle along which the vehicle is to be automatically guided. In embodiments of the present invention, a user of system 100 can enter coordinates which define a course for vehicle 105. In one embodiment, the user utilizes keypad 140 to manually enter the coordinates which define the course for the vehicle. In embodiments of the present invention, the coordinates for more than one vehicle course may be entered by a user. For example, a user can program system 100 to follow a path (e.g., a road) comprising a series of curves which may be defined as a series of short straight segments. Thus, a series of vehicle courses may define a road which vehicle 105 is guided along using system 100. Additionally, in embodiments of the present invention, other information such as the width of vehicle 105 or an implement coupled therewith (e.g., a plow attachment) may be entered into system 105. This facilitates determining a vector for steering vehicle 105 to avoid overplanting or creating gaps in coverage.

In another embodiment, the coordinates may be stored in a memory device coupled with system 100. For example, the coordinates of a previously stored vehicle course may be stored in a non-volatile memory or data storage device. Alternatively, the coordinates of the vehicle course may be determined by another computer system and transferred to system 100 using, for example, a portable memory storage device such as a SmartCard memory device, a universal serial bus (USB) memory device, or the like. In another embodiment, a wireless communication system may communicatively couple vehicle 105 with a communication network (e.g., the Internet) from which the vehicle course coordinates are accessed. In another embodiment, a user can drive vehicle 105 and set system 100 to continue the current direction for a designated distance.

In step 620 of FIG. 6, an indication is received that a pre-defined parameter has been exceeded. Embodiments of the present invention utilize a variety of pre-defined parameters which are used to define operating parameters for system 100. For example, in embodiments of the present invention, when a system fault error is received, the generation of vehicle control commands is suspended until the fault is corrected.

In embodiments of the present invention, other pre-defined parameters for system 100 comprise, but are not limited to, a minimum vehicle speed, a maximum vehicle speed, an approach angle between vehicle 105 and the course vector, a cross-track error limit (e.g., the distance between vehicle 105 and the course vector), and/or a manual override by a user.

In step 630 of FIG. 6, the generation of a vehicle control command is suspended in response to receiving the indication of step 620. In embodiments of the present invention, if one of the pre-defined parameters discussed above with reference to step 620 is exceeded, vehicle control commands for automatically guiding vehicle 105 are automatically suspended. In embodiments of the present invention, generating vehicle control commands may not be resumed until vehicle 105 is again operating within the pre-defined parameters, or until a user of vehicle 105 makes an indication that automatic vehicle control is to be resumed, thereby initiating a new vehicle guidance session.

Embodiments of the present invention facilitate safe operation of an automatic vehicle guidance system because the automatic vehicle guidance system is logically disengaged when pre-defined parameters are exceeded. In the prior art, mechanical sensors (e.g., furrow feelers) were used to determine whether a tractor was accurately tracking a plowed furrow and the only way to disengage the guidance system was to manually disengage the steering motor from the steering wheel of the vehicle or to manually disengage the furrow feelers from the furrow.

Embodiments of the present invention, logically determine whether the vehicle is operating within a set of pre-defined parameters which may indicate that automatic vehicle control is desired by the user. For example, if system 100 detects that the user is manually steering vehicle 100, it is likely that the user does not want system 100 to be generating steering commands. If these commands were implemented by a drive motor coupled with the steering wheel (e.g., electric motor 310 of FIG. 3), if may interfere with the user's control of the vehicle and lead to an unsafe operating condition. Additionally, if the vehicle is operated below a minimum vehicle speed, it may indicate that the user is attempting to stop the vehicle and thus may not want the automatic vehicle guidance system to take over operating the vehicle. Additionally, if the user is attempting, for example, a three-point turn, the stop/slow down action performed while transitioning to reverse causes system to be logically disengaged from controlling vehicle 105. The user can press an engage button to re-engage the current course vector if desired.

If the vehicle is operated above a maximum vehicle speed, it may indicate that the user has driven off of a field and therefore does not want the automatic vehicle guidance system to take over operating the vehicle. Additionally, if the vehicle has exceeded a distance parameter from a portion of the course vector, it may indicate, for example, that the user has driven vehicle 105 off of a field and no longer desired automatic vehicle control to be implemented. Furthermore, if the user has driven vehicle 105 off of a field, but is now driving parallel to the field (e.g., on a road parallel to the field), the maximum speed parameter disengages the system 100 to prevent system 100 from attempting to control the vehicle while the user is operating vehicle 105 on the road.

Thus, embodiments of the present invention facilitate a logical disengagement of vehicle guidance system 100 while still allowing it to be physically coupled with the steering mechanism of the vehicle being controlled. This is much more convenient for users who previously had to manually disengage the drive motor from the steering wheel of the vehicle. For many users, this was especially tedious when performing repetitive operations, such as plowing a field, where manually disengaging the drive wheel was repeatedly performed.

Figure 7A:
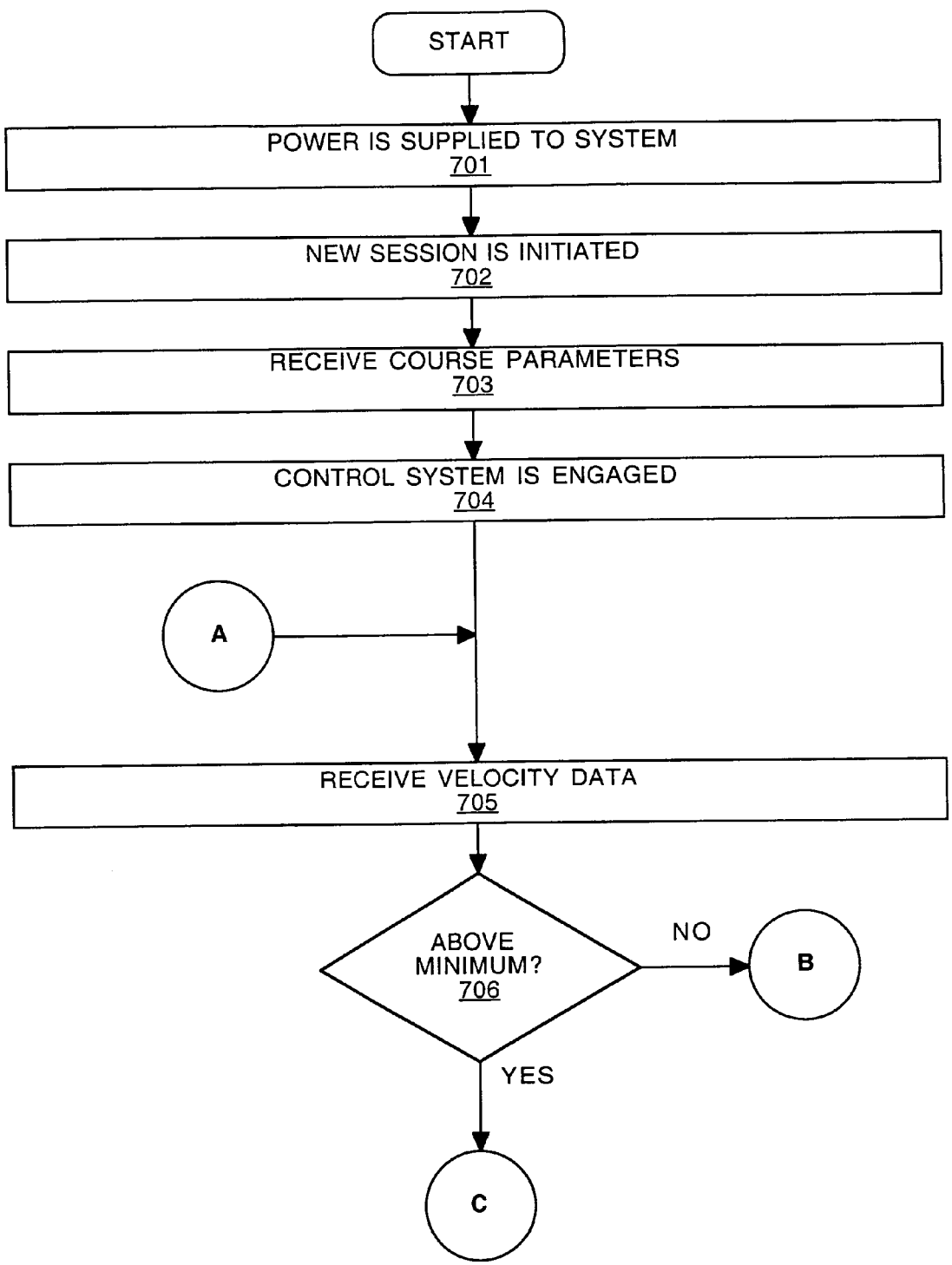
Figure 7B:
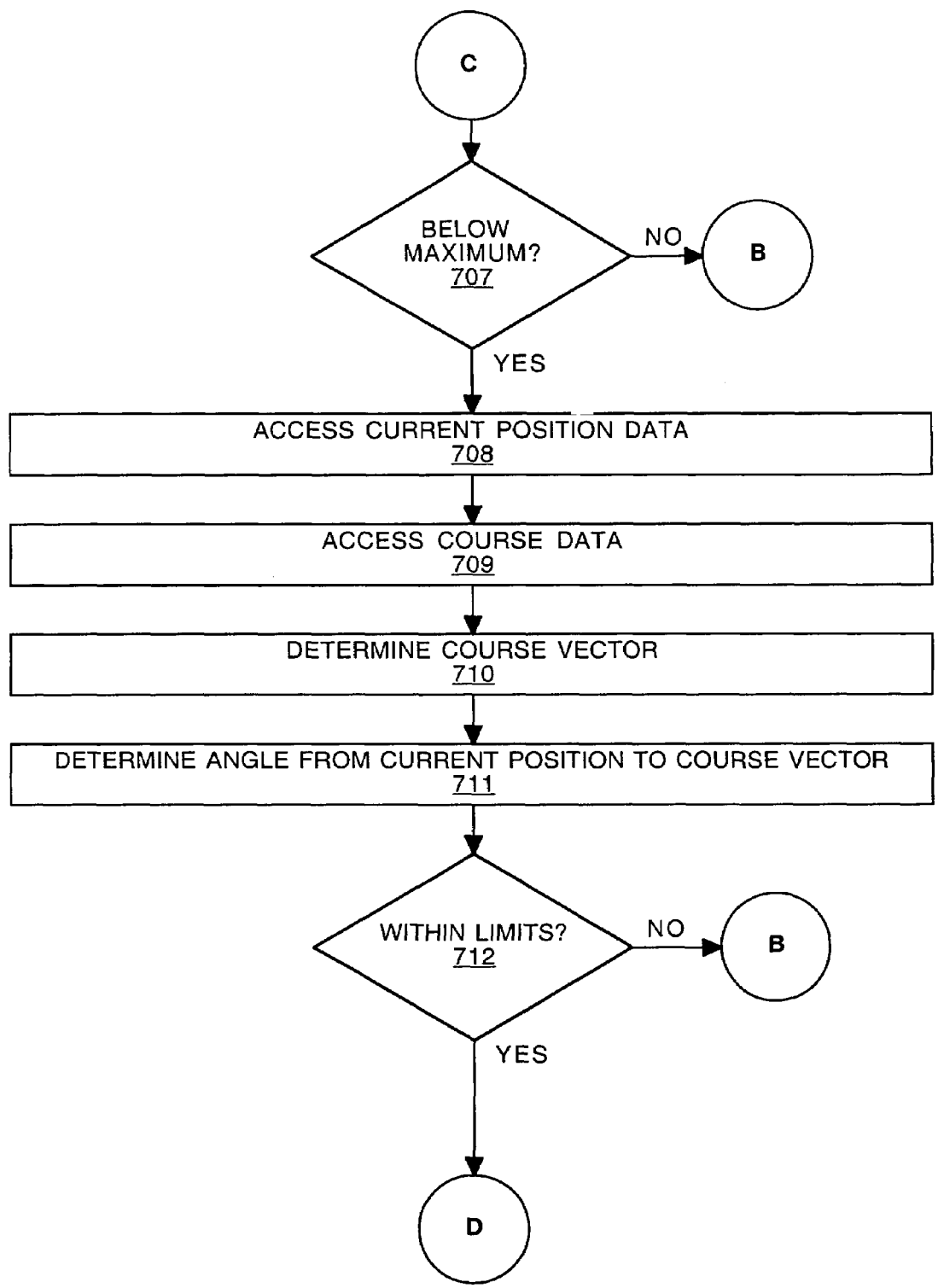

FIGS. 7A, 7B, and 7C are a flowchart of a method 700 for implementing automatic vehicle control in accordance with embodiments of the present invention. It is noted that in addition to the steps shown in FIGS. 7A, 7B, and 7C, a user can suspend or terminate the operation of system 100 at any time by, for example, pressing a designated button. In step 701 of FIG. 7, power is supplied to system 100 by a user pressing the power button of system 100.

In step 702 of FIG. 7, a new guidance session is initiated. In embodiments of the present invention, the user indicates that a new guidance session is being initiated.

In step 703 of FIG. 7, course parameters for the new guidance session are received. As described above with reference to step 610 of FIG. 6, system 100 accesses coordinates which define a vehicle course for vehicle 105. For example, a start point and end point of a swath, also known as the "A-B line," are entered into system 100.

In step 704 of FIG. 7, the control system is engaged. Once the user has entered the coordinates defining a vehicle course, the user manually indicates that system 100 is to be engaged. This prevents system 100 from automatically engaging as soon as the vehicle course coordinates are entered into system 100 and automatically guiding vehicle 105.

In step 705 of FIG. 7, velocity data is received. In embodiments of the present invention, data is received from a variety of monitoring devices to determine the operating parameters of vehicle 105. In step 705, data indicating the current operating speed or velocity of vehicle 105 is received by control component 120.

In step 706 of FIG. 7, a logical operation is performed to determine if the current velocity of vehicle 105 is above a minimum velocity parameter. In embodiments of the present invention, control component 120 compares the current velocity of vehicle 105 received in step 705 with a pre-defined minimum velocity parameter. If vehicle 105 is not exceeding the minimum velocity parameter (e.g., 5 miles per hour), method 700 continues at step 718 and the generation of vehicle control commands is suspended. If vehicle 105 is traveling above the minimum velocity parameter, method 700 proceeds to step 707. In one embodiment, the current velocity of vehicle 105 must be above the minimum velocity parameter for five consecutive readings taken every 200 milliseconds (200 ms).

In step 707 of FIG. 7, a logical operation is performed to determine if the current velocity of vehicle 105 is below a maximum velocity parameter. In embodiments of the present invention, control component 120 compares the current velocity of vehicle 105 received in step 705 with a pre-defined maximum velocity parameter. If vehicle 105 is exceeding the maximum velocity parameter (e.g., 15 miles per hour), method 700 continues at step 718 and the generation of vehicle control commands is suspended. If vehicle 105 is traveling below the maximum velocity parameter, method 700 proceeds to step 708. In one embodiment, the current velocity of vehicle 105 must be below the maximum velocity parameter for five consecutive readings taken every 200 milliseconds (200 ms).

In step 708 of FIG. 7, the current position data of vehicle 105 is accessed. In embodiments of the present invention, the current position data of vehicle 105 is obtained from position determining system 110. In embodiments of the present invention, a series of positions of vehicle 105 may be accessed to determine the direction in which vehicle 105 is traveling.

In step 709 of FIG. 7, the course parameters received in step 703 are accessed.

In step 710 of FIG. 7, a course vector is determined. In embodiments of the present invention, the course parameters received in step 703 define a first point, a second point, and a direction and distance between these two points. This information may be used in embodiments of the present invention to determine a vector of the course which is to be followed by vehicle 105.

In step 711 of FIG. 7, the angle from the current position of vehicle 105 to the course vector of step 710 is determined. In embodiments of the present invention, the current direction being traveled by vehicle 105, as determined in step 708 above, are compared with the direction of the course vector determined in step 710 above.

In step 712 a logical operation is performed to determine whether the angle from the current position of vehicle 105 to the course vector of step 710 is within a pre-defined parameter. In embodiments of the present invention, if the angle between these two directions exceeds a pre-defined entry angle parameter (e.g., 30° from the course vector direction), method 700 proceeds to step 718 and the generation of vehicle control commands is suspended. If the angle between these two directions does not exceed the pre-defined entry angle parameter, method 700 proceeds to step 713. In one embodiment, the angle from the current position of vehicle 105 to the course vector of step 710 must be within the pre-defined approach angle parameter for five consecutive readings taken every 200 milliseconds (200 ms).

In step 713 of FIG. 7, the distance from the current position of vehicle 105 to a point on the course vector is determined. In embodiments of the present invention, system 100 utilizes data from position determining system 110 to determine the current location of vehicle 105.

In step 714 of FIG. 7, a logical operation is performed to determine whether the distance from the current position of vehicle 105 to a point on the course vector is within a pre-defined parameter. In embodiments of the present invention, the course vector is defined as a series of geographic positions. Thus, system 100 may be used to determine the distance of vehicle 105 to a point comprising the course vector.

In one embodiment of the present invention, a user can enter additional information into system 100 such as the width of an implement coupled with vehicle 105. For example, if vehicle 105 is pulling a plow with a width of 30 feet, this information can be used to determine if the distance between vehicle 105 and a point of the course vector, also known as the "cross-track error," exceeds a pre-defined parameter. For example, the pre-defined distance parameter may define the maximum distance between vehicle 105 and a point on the course vector as being no farther than 3 feet," of the implement coupled with vehicle 105. Thus, if vehicle is more than 3 feet from a point of the designated course vector, method 700 proceeds to step 718 and the generation of vehicle control commands is suspended. While the present embodiment recites a cross-track error of no more than 3 feet, this can be a greater or lesser number in embodiments of the present invention.

In embodiments of the present invention, if the distance between vehicle 105 and a point of the course vector exceeds the pre-defined cross-track error parameter, method 700 proceeds to step 718 and the generation of vehicle control commands is suspended. If the distance between vehicle 105 and a point of the course vector does not exceed the pre-defined cross-track error parameter, method 700 proceeds to step 719. In one embodiment, the distance from the current position of vehicle 105 to a point on the course vector must be within the pre-defined cross-track error parameter for five consecutive readings taken every 200 milliseconds (200 ms).

In step 715 of FIG. 7, the current flow data from a current sensor is accessed. In embodiments of the present invention, motor control unit 313 is operable for determining the amount of current flowing into electric motor 310 and/or determining whether a user is manually operating steering wheel 330 of vehicle 105. In another embodiment, only current flow data is accessed by motor control unit 313 and is sent via coupling 115 to control component 120.

In step 716 of FIG. 7, a logical operation is performed to determine if a user is attempting to manually operate vehicle 105 based upon the data accessed in step 715. In embodiments of the present invention, system 100 can determine if a user is attempting to manually steer vehicle 105 based upon the amount of current flowing into, for example, electric motor 310. If it is determined that a user is manually operating vehicle 105, method 700 proceeds to step 718 and the generation of vehicle control commands is suspended. If it is determined that vehicle 105 is not being manually operated, method 700 proceeds to step 717.

In step 717 of FIG. 7, a logical operation is performed to determine whether a system fault error has been received. In embodiments of the present invention, device polling may be performed to determine if a system error condition exists with a component of system 100. In other embodiments, each component may independently generate a message to control component 120 conveying that a system error has occurred. It is noted that reception of a system fault error message may be received at any time in method 700 and cause an immediate suspension of vehicle control commands. In embodiments of the present invention, if a system fault error conditions exists, method 700 proceeds to step 718 and the generation of vehicle control commands is suspended. If no system fault error condition exists, method 700 returns to step 705.

In step 718 of FIG. 7, the generation of a vehicle control command is suspended. In embodiments of the present invention, vehicle control commands from steering controller are suspended. In one embodiment, the vehicle control commands are simply not conveyed to steering component 130. In another embodiment, the vehicle control commands are not generated at all. In another embodiment, course commands from vehicle guidance system 210 may be interrupted to prevent steering controller 220 from generating the steering commands.

Figure 8:
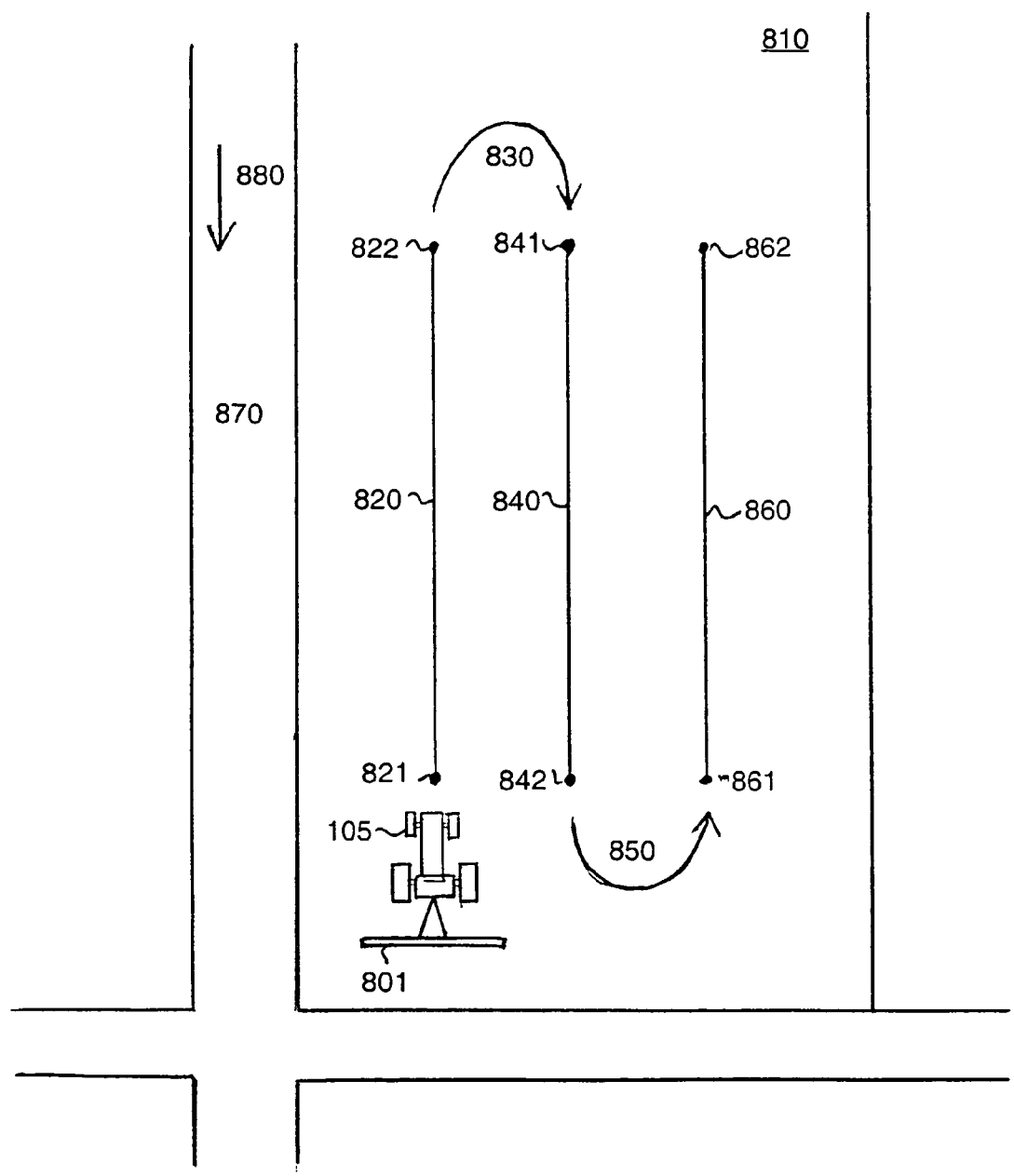
FIG. 8 shows a vehicle implementing automatic vehicle control with parameter-driven disengagement in accordance with embodiments of the present invention.

FIG. 8 shows a vehicle implementing automatic vehicle control in accordance with embodiments of the present invention. In FIG. 8, a user is operating a tractor (e.g., vehicle 105) pulling a plow 801 in a field 810. The user initiates vehicle guidance system 100 and indicates that a new guidance session is being initiated. The user then enters the coordinates (e.g., first coordinate 821 and second coordinate 822) of first swath 820. In embodiments of the present invention, system 100 determines the geographic position of first coordinate 821 and second coordinate 822, and a direction and distance of the vector between these two points. In so doing, system 100 has determined a course (e.g., first swath 820) for vehicle 105. Vehicle operation commences when the user engages system 100 by pressing an engage button.

Vehicle 105 then proceeds down swath 820 based upon vehicle control commands generated by control component 120. In embodiments of the present invention, the user controls the speed of vehicle 105 while guidance system 100 automatically controls the steering of vehicle 105 to guide it along the course defined by first swath 820. Thus, in embodiments of the present invention, as long as the user maintains the velocity of vehicle 105 between the upper and lower speed limits, steering commands continue to be generated by system 100.

When vehicle 105 reaches the end of first swath 820, the user manually turns the steering wheel of vehicle 105 to initiate a turn indicated by arrow 830. Vehicle guidance system 100 detects that the user is manually controlling vehicle 105 (e.g., step 716 of FIG. 7) and automatically suspends generating vehicle control commands. This prevents system 100 from generating steering commands in an attempt to direct vehicle 105 back onto first swath 820 and thus conflicting with the manual operation of vehicle 105. In one embodiment, vehicle guidance system 210 continues to generate vehicle course commands to steering controller 220, however, steering controller 220 does not generate steering commands in response to those course commands. In another embodiment, vehicle course commands from vehicle guidance system 210 are suspended as well.

As long as the user maintains the minimum speed throughout turn 830, the user can enter the coordinates for a new swath (e.g., 840) by entering a first coordinate 841 and a second coordinate 842. At some point of turn 830, the user can re-engage system 100 by pressing a button. System 100 will then determine the direction and distance of the course vector (e.g., 840) as well as the current geographic position and course of vehicle 105. Because the width of plow 801 is known to system 100, first coordinate 841 can be determined by system 100 to position the edge of plow 801 so that gaps or overplowing is minimized. If vehicle 105 is within the predefined distance parameter and the entry angle between vehicle 105 and swath 840 is within parameters, system 100 will again initiate automatically controlling the steering of vehicle 105 as it is guided along the course of swath 840. Additionally, system 100 can indicate to the user that control of the steering can be relinquished by the user at some point on turn 830. System 100 will then control the steering of vehicle 105 so that it is guided to first point 841 automatically and continue to steer the vehicle along that course.

At the end of swath 840, the user again manually steers vehicle 105 through the turn defined by arrow 850. As described above, as long as the user maintains the speed of vehicle 105 above the minimum speed parameter, the user can enter the coordinates of swath 860 (e.g., first coordinate 861 and second coordinate 862), press the engage button, and system 100 will generate steering commands to guide vehicle 105 along swath 860.

At the end of swath 860, the user finishes plowing field 810 steers vehicle 105 to road 870. As the user drives vehicle 105 in the direction shown by arrow 880, system 100 determines that vehicle 105 has exceeded the distance parameter. For example, the distance between vehicle 105 and swath 860 now exceeds the maximum cross-track error distance of 3 swaths based upon the width of plow 801.

Figure 9:
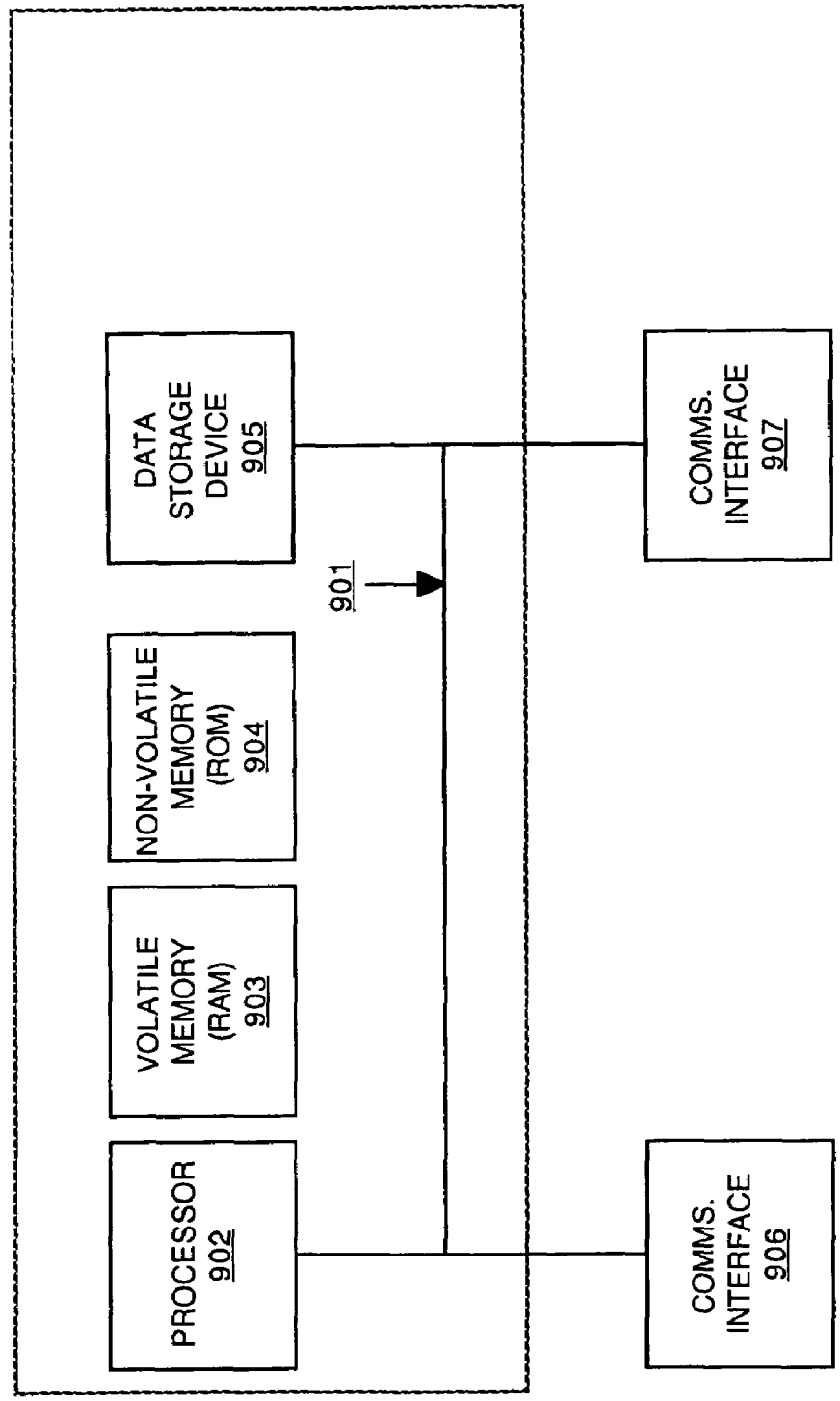
FIG. 9 is a block diagram of an exemplary vehicle guidance system used in accordance with embodiments of the present invention.

With reference to FIG. 9, portions of the present invention are comprised of computer-readable and computer-executable instructions that reside, for example, in vehicle guidance system 210. It is appreciated that vehicle guidance system 210 of FIG. 9 is exemplary only and that the present invention can be implemented by other computer systems as well.

In the present embodiment, vehicle guidance system 210 includes an address/data bus 901 for conveying digital information between the various components, a central processor unit (CPU) 902 for processing the digital information and instructions, a volatile main memory 903 comprised of volatile random access memory (RAM) for storing the digital information and instructions, and a non-volatile read only memory (ROM) 904 for storing information and instructions of a more permanent nature. In addition, vehicle guidance system 210 may also include a data storage device 905 (e.g., a magnetic, optical, floppy, or tape drive or the like) for storing vast amounts of data. It should be noted that the software program of the present invention for implementing automatic vehicle control can be stored either in volatile memory 903, data storage device 905, or in an external storage device (not shown). Vehicle guidance system 210 further comprises a first communication interface 906 coupled with bus 901 for receiving geographic position data from position determining system 110. Vehicle guidance system 210 also comprises a second communication interface 907 coupled with bus 901 for conveying course correction commands to steering controller 220. In embodiments of the present invention, first communication interface 906 and second communication interface 907 are serial communication interfaces.

The preferred embodiment of the present invention, a method and system for implementing automatic vehicle control, is thus described. While the present invention has been described in particular embodiments, it should be appreciated that the present invention should not be construed as limited by such embodiments, but rather construed according to the following claims.

What is claimed is:

1. A system for implementing automatic vehicle control, said system comprising:
   a position determining component configured for determining the geographic position of said vehicle;
   a steering component configured for controlling the steering mechanism of said vehicle; and
   a control component coupled with said position determining component and with said steering component, said control component configured to automatically determine whether it is coupled with either of an electric steering component and a hydraulic steering component and is further configured for generating a course correction in response to receiving position data from said position determining component and for suspending the generation of said course correction in response to said receiving an indication that a pre-defined parameter has been exceeded.

2. The system of claim 1 wherein said position determining component is a ground based position determining system.

3. The system of claim 1 wherein said position determining component is a satellite based position determining system.

4. The system of claim 3 wherein said satellite based position determining system is selected from the group consisting of a global positioning system (GPS) system, a differential GPS system, a real-time kinematics (RTK) system, a networked RTK system, a GLONASS system, and a Galileo system.

5. The system of claim 1 wherein said control component generates a control signal to said steering component.

6. The system of claim 1 further comprising a serial communication bus which communicatively couples said control component, said steering component, and said position determining component.

7. The system of claim 6 wherein said serial communication bus is substantially compliant with the controller area network (CAN) protocol.

8. The system of claim 1 wherein said control component is further configured for controlling a hydraulic steering component that is coupled with the steering mechanism of said vehicle.

9. The system of claim 1 wherein said steering component comprises an electric motor which is selected from the group consisting of a permanent magnet brush direct current (DC) motor, a brushless DC motor, a stepper motor, and an alternating current (AC) servo motor.

10. The system of claim 9 wherein said electric motor is coupled with a steering column of said vehicle via an actuator device comprising a drive wheel which controls a steering wheel of said steering mechanism.

11. The system of claim 10 wherein said actuator device controls said steering wheel via a sub wheel which is coupled with said steering wheel.

12. The system of claim 10 wherein said actuator device is coupled with a steering shaft of said vehicle.

13. The system of claim 1 further comprising a detection component configured for determining when a user is steering said vehicle and for initiating disengagement of said steering component in response to said determining.

14. The system of claim 1 wherein said control component determines a vector between a first geographic position and a second geographic position.

15. The system of claim 14 wherein said control component determines that a distance parameter between a point on said vector and the geographic position of said vehicle has been exceeded.

16. The system of claim 14 wherein said control component determines that a speed parameter has been exceeded.

17. The system of claim 14 wherein said control component determines that an approach angle between the geographic position of said vehicle and a point on said vector has been exceeded.

* * * * *

UNITED STATES PATENT AND TRADEMARK OFFICE
CERTIFICATE OF CORRECTION

| | | |
|---|---|---|
| PATENT NO. | : 7,574,290 B2 | Page 1 of 1 |
| APPLICATION NO. | : 11/000738 | |
| DATED | : August 11, 2009 | |
| INVENTOR(S) | : Gibson et al. | |

It is certified that error appears in the above-identified patent and that said Letters Patent is hereby corrected as shown below:

On the cover page,

Item [*] Notice:     Subject to any disclaimer, the term of this patent is extended or adjusted under 35 USC 154(b) by 614 days Delete the phrase "by 614 days" and insert -- by 971 days --

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,574,290 B2  Page 1 of 1
APPLICATION NO. : 11/000738
DATED : August 11, 2009
INVENTOR(S) : Gibson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1328 days.

Signed and Sealed this

Fourteenth Day of December, 2010

David J. Kappos
*Director of the United States Patent and Trademark Office*